(12) United States Patent
Chen

(10) Patent No.: US 7,821,761 B2
(45) Date of Patent: Oct. 26, 2010

(54) CURRENT INDUCTIVE TIMER SOCKET

(75) Inventor: Wan-Chiar Chen, Kaohsiung (TW)

(73) Assignee: Dinjoker Co., Ltd., Kaohsiung (TW)

( * ) Notice: Subject to any disclaimer, the term of this patent is extended or adjusted under 35 U.S.C. 154(b) by 668 days.

(21) Appl. No.: 11/778,026

(22) Filed: Jul. 14, 2007

(65) Prior Publication Data

US 2009/0015356 A1 Jan. 15, 2009

(51) Int. Cl.
*H01H 47/02* (2006.01)
(52) U.S. Cl. .................. 361/160; 361/87; 361/166; 361/170
(58) Field of Classification Search ............. 361/87, 361/160, 166, 170
See application file for complete search history.

(56) References Cited

U.S. PATENT DOCUMENTS

| 5,430,598 | A | * | 7/1995 | Rodolfo et al. ............. 361/115 |
| 5,742,466 | A | * | 4/1998 | Kram ......................... 361/118 |
| 6,476,523 | B1 | * | 11/2002 | Lee ............................ 307/141 |
| 7,388,735 | B2 | * | 6/2008 | Chen .......................... 361/160 |
| 7,505,237 | B2 | * | 3/2009 | Baxter ......................... 361/42 |
| 2007/0146957 | A1 | * | 6/2007 | Chen .......................... 361/160 |

* cited by examiner

*Primary Examiner*—Jared J Fureman
*Assistant Examiner*—Christopher J Clark
(74) *Attorney, Agent, or Firm*—Banger Shia

(57) ABSTRACT

A current inductive timer socket comprises: a principle relay circuit, a reed relay circuit, a plurality of diodes, a reed relay and a resistance, a counter circuit, a holding circuit, a time switch circuit and amplification circuit. When the electric appliance is in use, a signal of voltage drop produced at both ends of the rated resistance will be amplified by the operational amplifier and then transmitted to the counter circuit and an overload detecting circuit, making the counter circuit start to count automatically, and thus time operation is carried out. Further, when electric appliance is overloaded or in the case of short circuit, the power source can also be cut off automatically.

7 Claims, 4 Drawing Sheets

CURRENT INDUCTIVE TIMER SOCKET

BACKGROUND OF THE INVENTION

1. Field of the Invention

The present invention relates to a timer socket, and more particularly to a current inductive timer socket, when an electric appliance starts to operate, current will flow through the timer of the current inductive timer socket, turning on the timer and making it start to count, and after the timer counts to a predetermined value, it will cut off the power supply to the electric appliance.

2. Description of the Prior Art

Some people always forget to turn off the electric appliances after use, for example, forgetting to turn off the electric iron after ironing, this is not only power consuming but also the hot iron is likely to ignite the furniture, causing fire. Although the electric appliances may have a timer, if the user forgets to set it, the electric appliances will not be turned off automatically.

The present invention has arisen to mitigate and/or obviate the afore-described disadvantages.

SUMMARY OF THE INVENTION

The primary objective of the present invention is to provide a timer socket that can cut off the power automatically after the set time is up, thus ensuing safe use of the electric appliance plugged in the timer socket even if the user forgets to turn off the electric appliance. On the other hand, if electric appliance is overloaded or a short circuit occurs, it can also be detected by the overload detecting circuit, and the power source can be cut off automatically.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
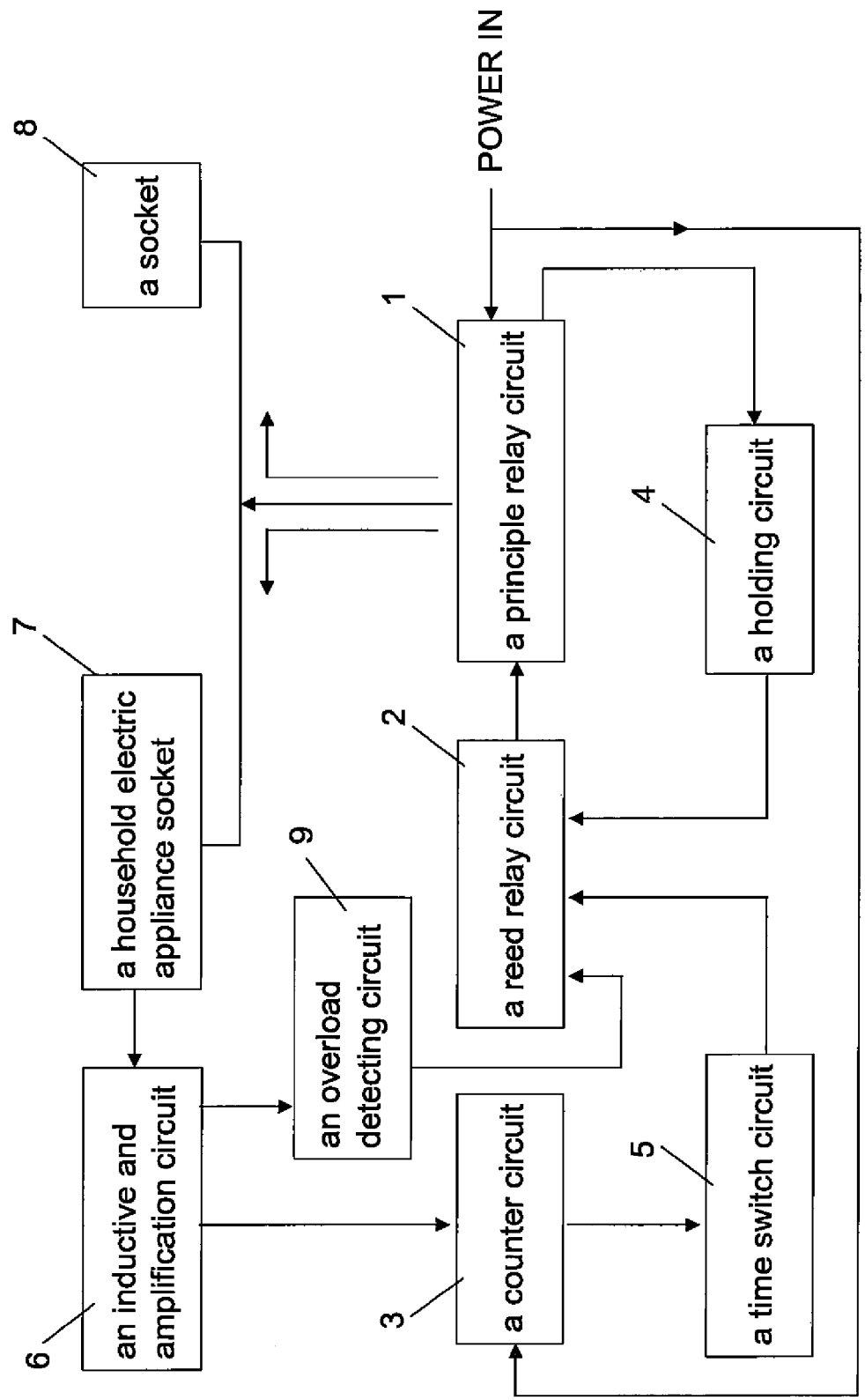
FIG. 1 is a block diagram of showing a control circuit of a current inductive timer socket in accordance with the present invention.

Referring to FIGS. 1-4, a current inductive timer socket in accordance with the present invention is illustrated and comprises a principle relay circuit 1, a reed relay circuit 2, a counter circuit 3, a holding circuit 4, a time switch circuit 5, an inductive and amplification circuit 6, a household electric appliance socket 7, a socket 8 for connection of another current inductive timer socket, and a overload detecting circuit 9. The principle relay circuit 1 includes two voltage input terminals A, B, and an inductive output relay having three contact points: C, NC and NO. The output relay is used to control the power transmitted to the household electric appliance socket 7 and the socket 8. Therefore, the present invention allows a plurality of current inductive timer sockets to be connected in series, and each of the current inductive timer sockets is then connected in series to electric equipments. The current inductive timer sockets are set differently so that the electric equipments can be controlled to work according to the predetermined program.

The reed relay circuit 2 includes a rectifying and filtering capacitor 2C, two diodes D1, D2, a reed relay 21, and a resistance 2R. The reed relay circuit 2 is used to receive the signal from the exciting transistors Tr1, Tr2 and Tr3 of the time switch circuit 5, and to start the output relay 11. The counter circuit 3 includes a DC rectifier, an inverter 3C9, and seven series-connected counters 3C1-3C7 that are senary, decimal, senary, decimal, decimal, senary and decimal. The counter 3C1 has an input terminal P, and the counter 3C3 has an input terminal Q. When a time select switch 3S1 is started, current will flow from the inverter 3C9 to the point P, the set time is at the most 9 hours and 59 minutes. When the current flows from inverter 3C9 to the point Q, the set time is no more than 9 minutes and 59 seconds. The holding circuit 4 plays an important role when the electric appliance is in use, when the set time is up, the output relay 11 will be started, and the common point C of the output relay 11 will be disconnected from the normal contact point NC. The common point C is connected to the power source point A, the normal contact point NC will be connected to the household appliance socket 7 via a rated resistance RM, and finally will be connected to the power source point B after passing through the inner circuit of the electric appliance (when the electric appliance is in use, its inner circuit is turned on). Therefore, a voltage will be produced between the common point C and the normal contact point NC. The voltage will then turn on the neon light 41, illuminating the photodiode 42, so that the reed relay 21 will be kept on, the output relay 11 also will be kept on, and thus the set time is up, turning off the electric appliance. Therefore, the holding circuit 4 includes the neon light 41, the photodiode 42, an operational amplifier OP3, a transistor Tr4, a diode D4 and a resistance 4R.

The time switch circuit 5 includes three time switches 5S1, 5S2 and 5S3, and three series-connected exciting Transistors Tr1, Tr2 and Tr3, and the time units of the time switches 5S1, 5S2 and 5S3 are minute, ten minute and hour. Between the counters 3C5, 3C6, 3C7 and the minute time switch 5S1, the ten-minute time switch 5S2, the hour time switch 5S3 are connected a minute diode 5D1, a ten-minute diode 5D2 and a hour diode 5D3, so as to stabilize the signal. The time switches 5S1, 5S2 and 5S3 can be dip switch or rotary switch. The rotary switch is a "one-input ten-output and one-input six-output" element. The time select switch 3S1 has a minute's time set and an hour's time set. The inductive and amplification circuit 6 includes a transformer T parallel-connected to the rated resistor RM, a set of two-stage operational amplifiers OP1, OP2 parallel-connected to a resistance 6R, and a capacitor. The inductive and amplification circuit 6 outputs voltage-stabilized current to the counter circuit 3. The overload detecting circuit 9 receives the signal of the operational amplifier OP1, and then the signal is amplified by an operational amplifier OP4 and is filtered into DC by the rectifier, the capacitor and the resistance, and finally is appropriately divided by a variable resistance 9VR to push the transistor Tr5. When the value of the current flowing through a rated resistance RM exceeds the predetermined limit (namely the predetermined value set and adjusted by the variable resistance 9VR), the DC voltage outputted from the operational amplifier OP4 can exceed the variable resistance 9VR so as to push the transistor Tr5, thus actuating the reed relay 21 and the output relay 11 to turn off the power source.

Figure 2:
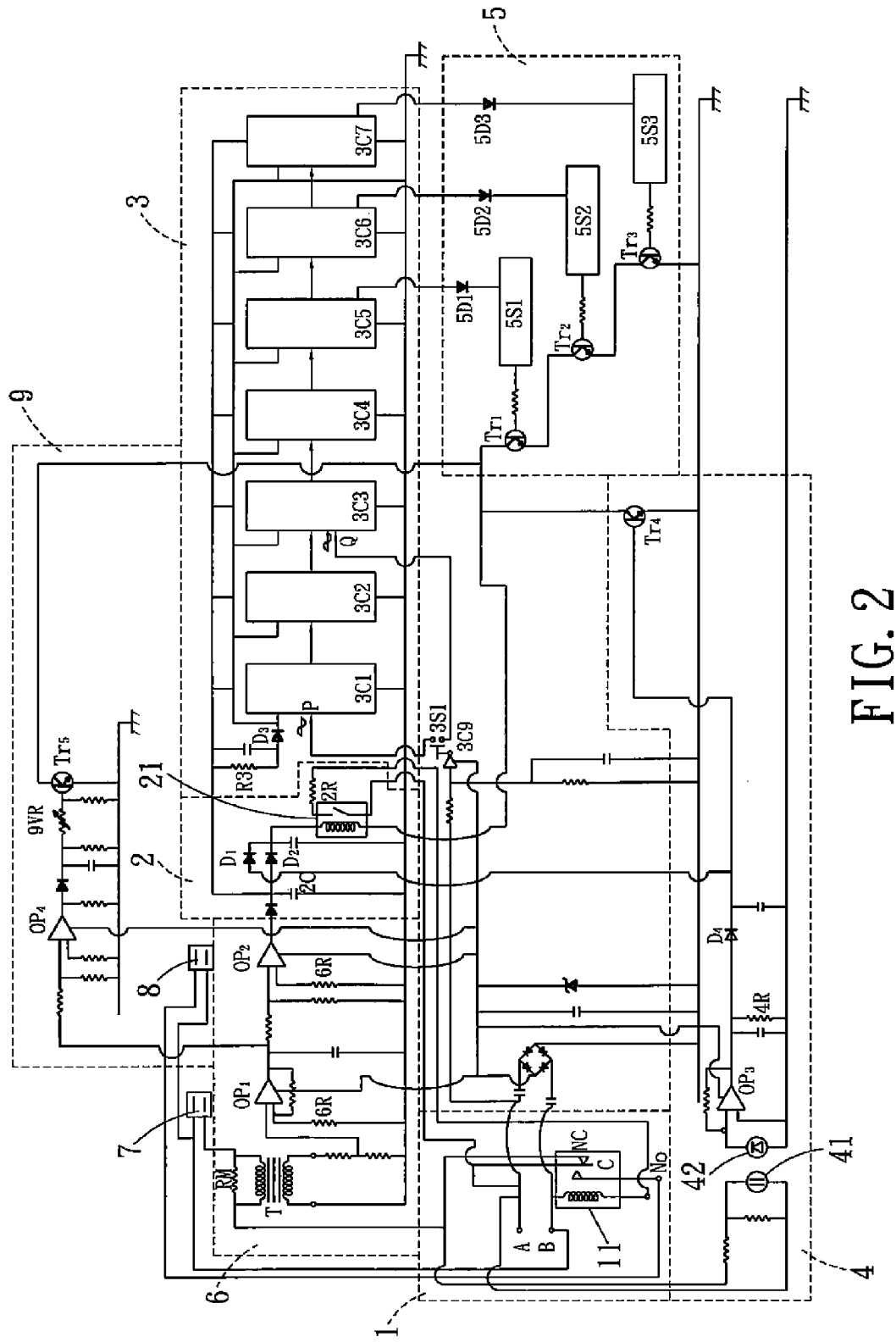
FIG. 2 is a circuit diagram of showing the control circuit a current inductive timer socket in accordance with the present invention.
Figure 3:
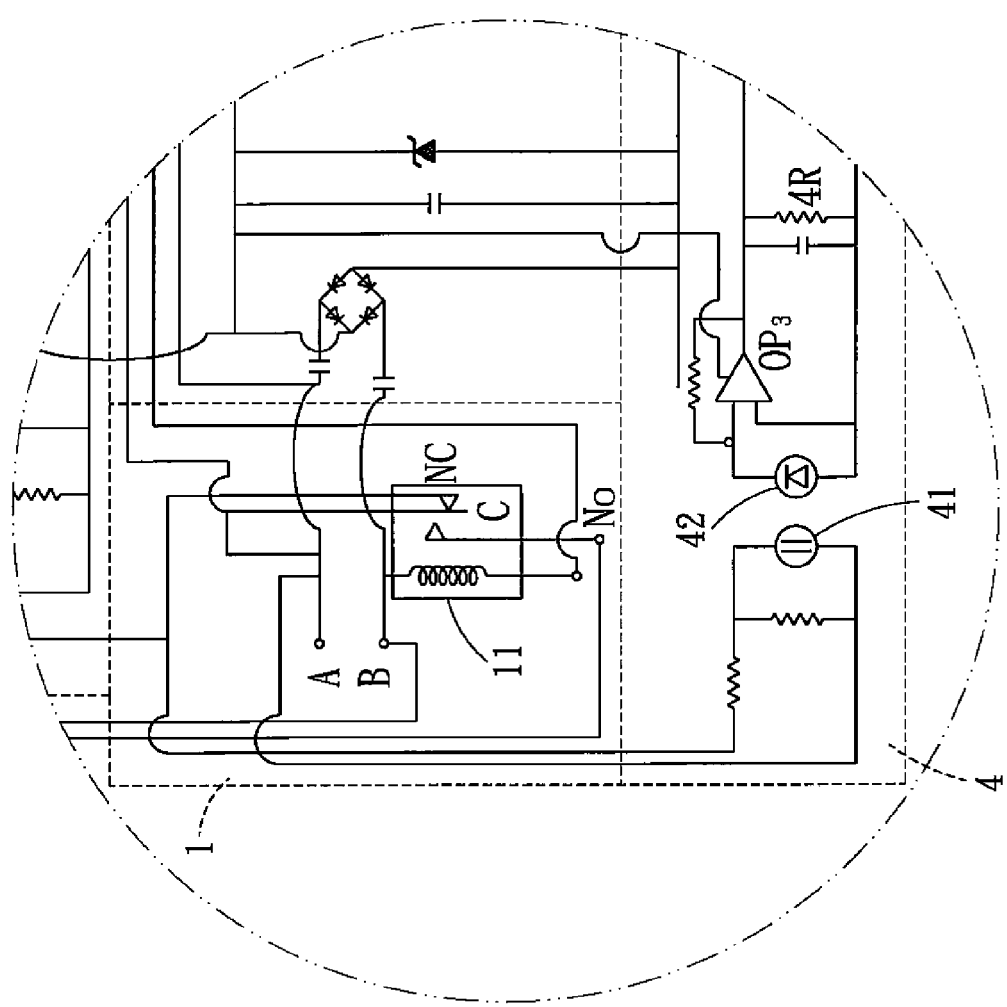
FIG. 3 is an enlarged view of a part of the control circuit a current inductive timer socket in accordance with the present invention.
Figure 4:
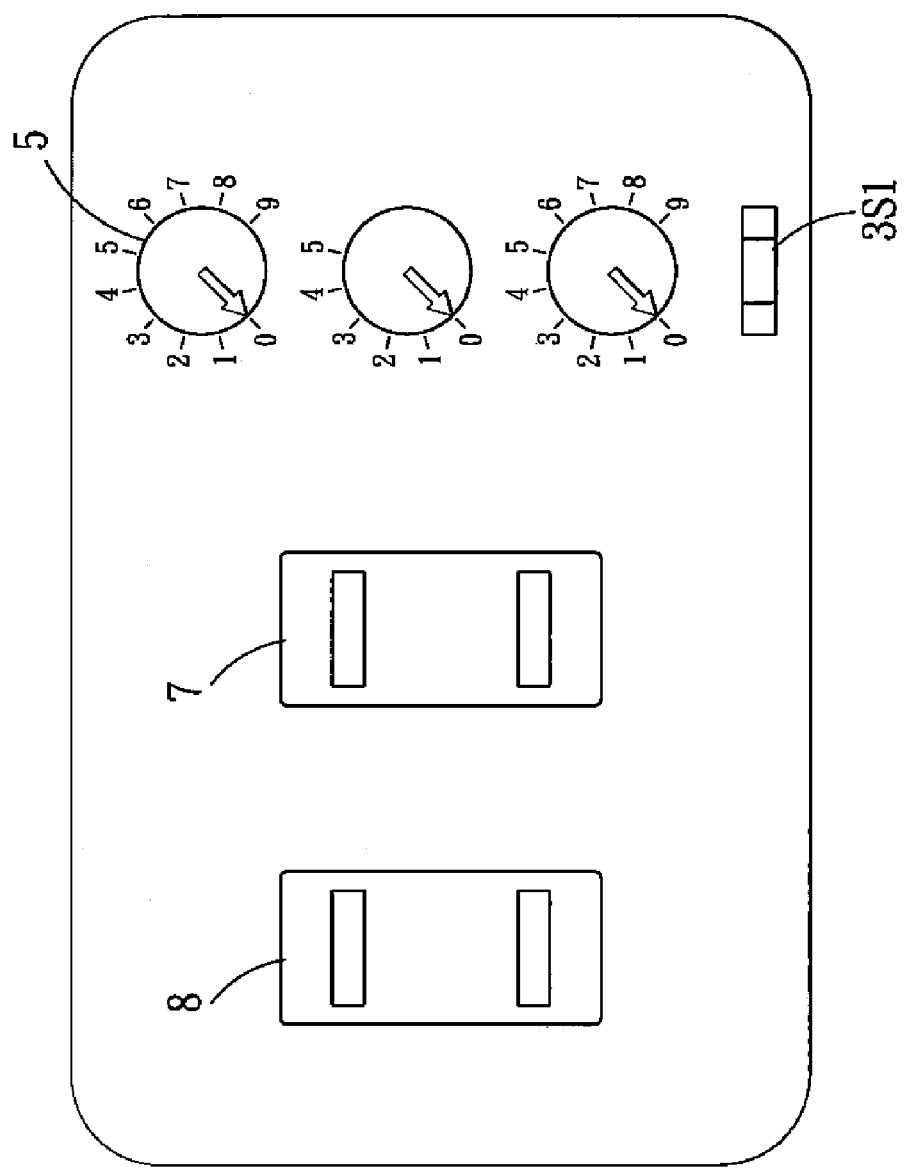
FIG. 4 shows the current inductive timer socket in accordance with the present invention.

As shown in FIG. 2, after the time switches 5S1, 5S2 and 5S3 are set, and the plug of the household electric appliance is inserted in the household electric appliance socket 7, the household electric appliance can start to work. During use, current will pass through the electric appliances, for example, a 110 v, 100 w electric appliance will have 0.9 A current, and the current will also pass through the rated resistance RM, producing a voltage drop at both ends of the rated resistance RM. The minor voltage drop will be considered as a signal and then will be amplified and transmitted to the counter circuit 3, so as to start the counters 3C1-3C7. At this moment, the timer function begins to take effect. The specification of the rated resistance RM has relationship to the specification of the electric appliance. If the rated resistance RM is too great, it will produce a lot of heat, and if the rated resistance RM is too small, the counters cannot be started. If the rated resistance RM is 0.01 ohm, the power of the corresponding electric appliance should range from 30-1000 w.

As shown in FIG. 2, the minor voltage drop is considered as a signal that is to be amplified by the operational amplifiers OP1 and OP2, and then it will pass through a diode D3, a resistance R3 and will be transmitted to the counters 3C1-3C7, at the same time, the counters are returned to zero. After that, the counters 3C1-3C7 start to count based on the household current of 60 cycles per second. When the original preset time that set by time switches 5S1, 5S2 and 5S3 is reached, the exciting transistors Tr1, Tr2 and Tr3 of the time switch circuit 5 will enable the reed relay 21 and the output relay 11 to cut off the electric supply, thus turning off the electric appliance automatically. On the other hand, if overload or short circuit occurs when the electric appliance is in use, the current flowing through the rated resistance RM will become very large, the amplified signal outputted from the operational amplifiers OP1, OP2, OP3 and OP4 must exceed the predetermined value of the variable resistance 9VR after being rectified and filtered, so as to push the transistor Try, thus actuating the reed relay 21 and the output relay 11 to turn off the power source.

During use of the electric appliance, when the set time is up, the common point C of the output relay 11 will be disconnected from the normal contact point NC. The common point C is connected to the power source point A, the normal contact point NC will be connected to the household appliance socket 7 via a rated resistance, and finally will be connected to the power source point B after passing through the inner circuit of the electric appliance (when the electric appliance is in use, its inner circuit is turned on). Therefore, a voltage will be produced between the common point C and the normal contact point NC. The voltage will then turn on the neon light 41, illuminating the photodiode 42, namely, photocoupler. The photocoupler will produce a signal voltage that will be amplified by the operational amplifier OP3 and transmitted to the transistor Tr4, enabling the reed relay 21 to keep the output relay 11 on, thus the timing operation is finished. After that, if the user turns off the switch of the electric appliance, the circuit, consisted of the normal contact NC of the output relay 11, the rated resistance RM, the household electric appliance socket 7, the inner circuit of the electric appliance and the power source point B, will be cut off. As a result, the voltage between the common point C and the normal contact point NC will disappear, and the neon light 41, the photodiode 42 and the operational amplifier OP3 will be turned off. Meanwhile, the reed relay 21 will be opened, and the output relay 11 will be restored to normal. In this way, another cycle of timing operation can start when the electric appliance is used again.

The present invention has the following advantages: during use of the electric appliance, the current passing through the electric appliance will activate the timer of the current inductive timer socket automatically. If the rotary button or key of the time is not adjusted, the set time will not be changed and needn't to be set every time, this is helpful to the forgetful user. If the electric appliance is broken or the user forgets to turn it off, the present invention can turn off the electric appliance automatically. For example, it is very dangerous if an electric cooker cannot be turned off due to the failure of its temperature-control switch. However, it will be safer and the electric cooker can be turned off automatically if it is connected to a current inductive timer socket. Furthermore, the present invention allows a plurality of current inductive timer sockets to be connected in series, and each of the current inductive timer sockets is then connected in series to electric equipments. The current inductive timer sockets are set differently so that the electric equipments can be controlled to work according to the predetermined program.

In addition, the combination of the holding circuit 4 and the reed relay circuit 2 is a linked device and can be replaced by the following devices: 1) using a photocoupler consisted of a light resistance Cds and a neon light to control a silicon control switch TRIAC, or 2) keep relay, latching relay.

While we have shown and described various embodiments in accordance with the present invention, it should be clear to those skilled in the art that further embodiments may be made without departing from the scope of the present invention.

What is claimed is:

1. A current inductive timer socket comprising:
 a principle relay circuit including an output relay and a voltage input terminal, the output relay controls a power transmitted from the voltage input terminal to a household electric appliance socket or a second current inductive timer socket;
 a reed relay circuit including a capacitor, a plurality of diodes, a reed relay and a resistance, and being used to receive signals from exciting transistors of a time switch circuit, and to start the output relay;
 a counter circuit including a DC rectifier, seven series-connected counters, and a time select switch;
 a holding circuit including a neon light, a photodiode, an operational amplifier, a transistor, a diode and a resistance;
 wherein the time switch circuit includes three time switches, and three series-connected exciting transistors, and the time units of the three time switches are minute, ten minute and hour;
 an inductive and amplification circuit including a transformer parallel-connected to a rated resistor, a set of two-stage operational amplifiers, a resistance, and a capacitor;
 an overload detecting circuit being set with a predetermined maximum value, when a signal processed by the inductive and amplification circuit exceeds the predetermined maximum value, the reed relay and the output relay are actuated to turn off a power source;
 the household electric appliance socket for connection of a household electric appliance;
 the second current inductive timer socket for connection of another current inductive timer socket;
 when an electric appliance is connected to the current inductive timer socket, a signal of voltage drop will be produced at both ends of the rated resistance, and then will be amplified by the operational amplifier and transmitted to the counter circuit and the overload detecting circuit, when the counter circuit counts to a predetermined value, the time switches will send signals to the three exciting transistors, so as to start the reed relay and the output relay, thus cutting off the power supply to the electric appliance, meanwhile, the holding circuit will keep the output relay on, thus a timing operation is finished, after that, if the user turns off a switch of the electric appliance, the holding circuit will make the output relay switch off, returning to its original state, on the other hand, if electric appliance is overloaded or a short circuit occurs, the current flowing through the rated resistance will become very large, the signal flowing from the amplification circuit to the overload detecting circuit will also increase and once it exceeds the predetermined maximum value, the overload detecting circuit will actuate the reed relay and the output relay to turn off the power source.

2. The current inductive timer socket as claimed in claim 1, wherein the voltage input terminal, under the control of the output relay, outputs power to the household electric appliance socket or to the second current inductive timer socket, thus a plurality of current inductive timer sockets are allowed to be connected.

3. The current inductive timer socket as claimed in claim 1, wherein the seven series-connected counters are senary, decimal, senary, decimal, decimal, senary and decimal.

4. The current inductive timer socket as claimed in claim 1, wherein a maximum set time of the counter circuit is decided by the time switches, and a signal is switched to an input terminal of a first counter or an input terminal of a second counter, for hour/minute setting or minute/second setting.

5. The current inductive timer socket as claimed in claim 1, wherein each of the time switches is in the form of a dip switch or a rotary switch.

6. The current inductive timer socket as claimed in claim 1, wherein a combination of the holding circuit and the reed relay circuit is a linked device and is replaced by the following devices: 1) using a photocoupler consisted of a light resistance Cds and a neon light to control a silicon control switch TRIAC, or 2) keep relay, latching relay.

7. The current inductive timer socket as claimed in claim 1, wherein the overload detecting circuit is set with a predetermined voltage to determine the passage or non-passage of a transistor (Tr5), the predetermined voltage is a predetermined maximum overload value, once a voltage detected exceeds the predetermined maximum overload value, the reed relay and the output relay will be immediately actuated to turn off the power source.

* * * * *